(12) United States Patent
Highgate

(10) Patent No.: US 12,091,481 B2
(45) Date of Patent: Sep. 17, 2024

(54) ELECTRICALLY CONDUCTING HYDROPHILIC CO-POLYMERS

(71) Applicant: SUPERDIELECTRICS LTD, Royston (GB)

(72) Inventor: Donald James Highgate, Royston (GB)

(73) Assignee: SUPERDIELECTRICS LTD, Royston (GB)

(*) Notice: Subject to any disclaimer, the term of this patent is extended or adjusted under 35 U.S.C. 154(b) by 410 days.

(21) Appl. No.: 17/193,199

(22) Filed: Mar. 5, 2021

(65) Prior Publication Data
US 2021/0269571 A1    Sep. 2, 2021

Related U.S. Application Data

(63) Continuation of application No. 16/081,630, filed as application No. PCT/GB2016/053752 on Nov. 30, 2016, now Pat. No. 10,941,233.

(30) Foreign Application Priority Data

Mar. 11, 2016    (GB) ...................................... 1604248

(51) Int. Cl.
| | | |
|---|---|---|
| *C08F 226/10* | (2006.01) | |
| *B33Y 70/00* | (2020.01) | |
| *C08F 2/48* | (2006.01) | |
| *C08F 220/12* | (2006.01) | |
| *C08F 220/44* | (2006.01) | |
| *C08F 273/00* | (2006.01) | |

(Continued)

(52) U.S. Cl.
CPC ............ *C08F 226/10* (2013.01); *B33Y 70/00* (2014.12); *C08F 2/48* (2013.01); *C08F 220/12* (2013.01);

(Continued)

(58) Field of Classification Search
CPC ....... H01B 1/124; H01B 1/122; C08F 226/10; H01G 4/01

(Continued)

(56) References Cited

U.S. PATENT DOCUMENTS

| | | | |
|---|---|---|---|
| 2006/0235169 A1 | 10/2006 | Yamasaki | |
| 2016/0177109 A1 | 6/2016 | Hendricks et al. | |
| 2016/0284480 A1* | 9/2016 | Lim ...................... | H01G 11/02 |

FOREIGN PATENT DOCUMENTS

| | | |
|---|---|---|
| CN | 104252973 | 12/2014 |
| EP | 1061530 | 12/2000 |

(Continued)

OTHER PUBLICATIONS

Heraeus, Conductive Polymers Division, CLEVIOS™ PH 500—technical data sheet URL: http://thenanoholdings/data/goodsImages/GOODS1_1400490383.pdf, Nos. 81076210 and 81076827, Issue Feb. 4, 2013.

(Continued)

*Primary Examiner* — Tri V Nguyen
(74) *Attorney, Agent, or Firm* — SALIWANCHIK, LLOYD & EISENSCHENK

(57) ABSTRACT

A process of forming a cross-linked electronically active hydrophilic co-polymer is provided and includes the steps of: a. mixing an intrinsically electronically active material with water to form an intermediate mixture; b. adding at least one hydrophilic monomer, at least one hydrophobic monomer, and at least one cross-linker to the intermediate mixture to form a co-monomer mixture; and c. polymerising the co-monomer mixture.

18 Claims, 2 Drawing Sheets

(51) Int. Cl.
  *C09J 4/06* (2006.01)
  *H01B 1/12* (2006.01)
  *H01G 4/01* (2006.01)
(52) U.S. Cl.
  CPC .......... *C08F 220/44* (2013.01); *C08F 273/00* (2013.01); *C09J 4/06* (2013.01); *H01B 1/122* (2013.01); *H01B 1/124* (2013.01); *H01G 4/01* (2013.01)
(58) Field of Classification Search
  USPC .......................... 252/500, 510, 511; 429/232
  See application file for complete search history.

(56) References Cited

FOREIGN PATENT DOCUMENTS

| EP | 2774538 | 9/2014 | |
|---|---|---|---|
| EP | 2988351 A1 * | 2/2016 | ............... H01B 1/24 |
| GB | 2380055 | 3/2003 | |
| GB | 2479449 | 10/2011 | |
| JP | 2014152320 | 8/2014 | |
| KR | 2010-0039910 | 4/2010 | |
| RU | 2252468 | 5/2005 | |
| RU | 2576425 | 12/2015 | |

OTHER PUBLICATIONS

International Search Report and Written Opinion, PCT International Application No. PCT/GB2016/053752, PCT/ISA/210; PCT/ISA/237, mail date Mar. 29, 2017.

Canadian Office Action/Examination Report, CA Application No. 3,015,282, issued date Dec. 6, 2022, 9 pages.

Aouada et al., "PAAm and PEDOT/PSS hydrogel as potential electroactive devices: evaluation of surface and hydrophilic properties", e-Polymers, No. 154, pp. 1-13, https://www.e-polymers.org, Nov. 29, 2008 (Nov. 29, 2008), 13 pages.

* cited by examiner

ELECTRICALLY CONDUCTING HYDROPHILIC CO-POLYMERS

CROSS-REFERENCE TO RELATED APPLICATIONS

The present application is a continuation application of U.S. application Ser. No. 16/081,630, filed Aug. 31, 2018, which is a national stage application of International Application No. PCT/GB2016/053752, filed Nov. 30, 2016, which claims priority to Great Britain Application No. 1604248.3, filed Mar. 11, 2016, the disclosures of each of which are incorporated herein by reference in their entirety, including any figures, tables, and drawings.

FIELD OF THE INVENTION

The present invention relates to electronically active hydrophilic polymers and their production.

BACKGROUND OF THE INVENTION

Intrinsically electronically conductive polymers are known, and are understood to mean materials in which the conduction process is principally dependent upon electron transfer. This is in contrast to ionically conductive polymers, where the conduction process is principally dependent on ion transfer.

As a result of their electronic conductivity, electronically conductive polymers may have applicability within electronic systems, such as car batteries, mobile phone screens and computer screens. The functioning of these electronic systems relies on the transmission and proper control of electrons. Electronically conductive polymers include polyacetylene, which has achieved electrical conductivities of 107 S/m approximating to that of common metals, while commercial materials supplied as dispersions in water, e.g. polyethylenedioxythiophene:polystyrene sulphonate (PEDOT:PSS, commercially available as Clevios 500®), have a conductivity of $3 \times 10^4$ S/m and exceed the conductivity of graphite commonly used as a conductor in electrochemical cells.

However, electronically conductive polymers have poor water properties, and this limits their applicability in aqueous environments. These electronically conductive polymers become unstable when dispersed or dissolved in aqueous environments. They are therefore of most use when they are dry, and are of very limited use in electronic systems with a water-based environment e.g. car batteries. Water-based environments in electronic systems may be saline, acid or alkaline aqueous environments.

Further, electronically conductive polymers can be challenging to produce, and are usually produced as a non-self-supporting film. Owing to their non-self-supporting nature, polymerisation is carried out on a solid support, such as a glass sheet, in order to form these polymers. As such, the resulting polymer is a largely two-dimensional film, rather than a bulk three-dimensional structure.

SUMMARY OF THE INVENTION

Figure 1:
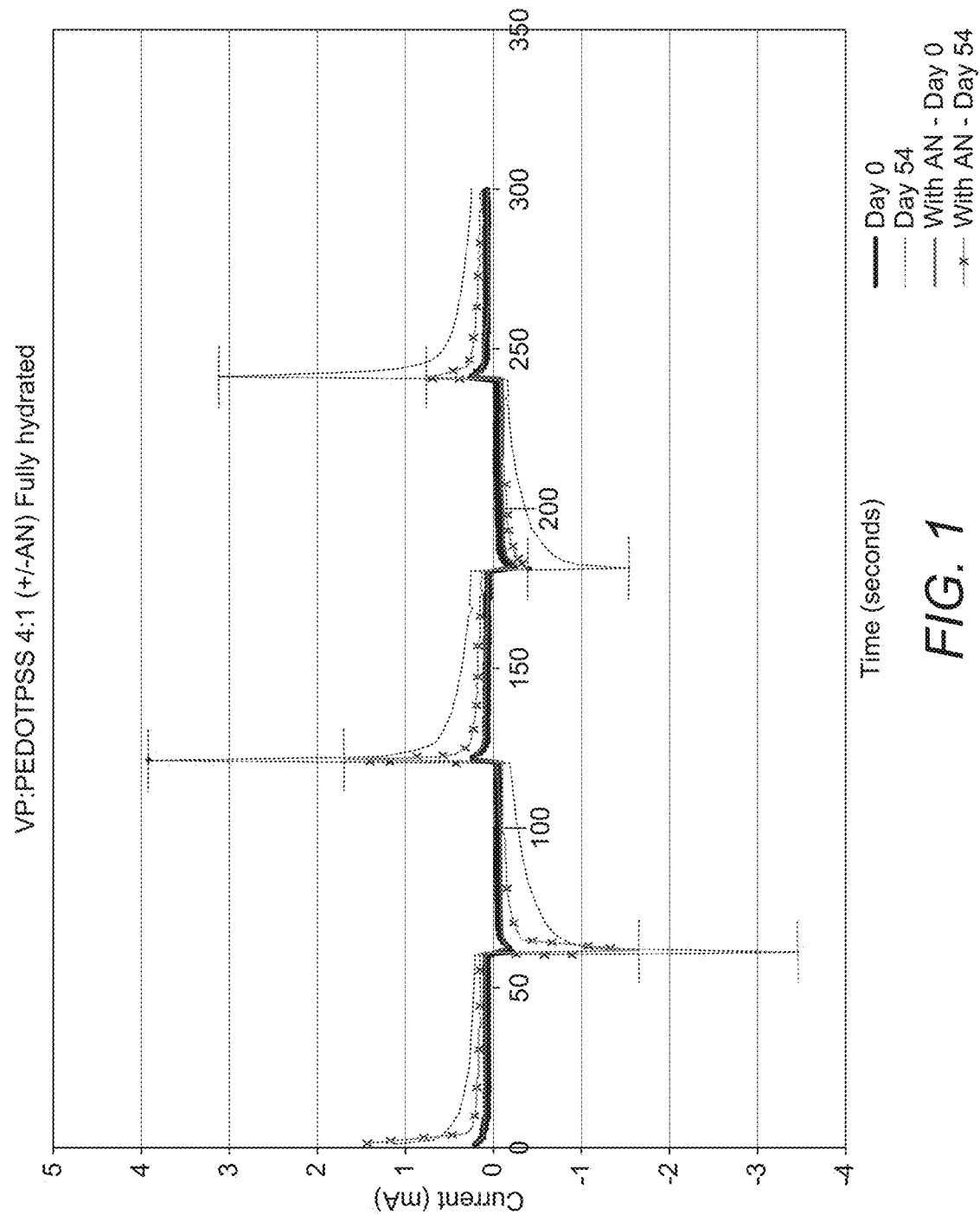
FIG. 1 is a plot of current versus time for vinyl-2-pyrrolidone and polyethylenedioxythiophene polysteyrene sulphonate (VP-PEDOTPSS) in a 4:1 ratio (with and without acrylonitrile (AN)) after a maximum level of hydration was achieved.

It has been found that, when mixed in a particular order, a co-monomer mixture comprising at least one hydrophobic monomer, at least one hydrophilic monomer, water, at least one cross-linker, and an intrinsically electronically active material, provides (once polymerised) a new electronically active hydrophilic co-polymer. This material is homogenous and isotropic in its conductive properties, and in its water properties. It is hydrophilic, crosslinked and electronically conductive, throughout its entire structure.

As a result of their hydrophilicity, the co-polymers described herein have good water properties resulting in improved performance in aqueous environments of electronic systems (existing hydrophilic materials are ionically conductive, rather than electronically conductive). The co-polymers are stable in a wide-variety of different water-based environments, and perform well not only in distilled deionized (DD) water, but also in aqueous environments such as saline, acid or alkali solution. Furthermore, the co-polymers described herein also have excellent mechanical properties and electrical conductivity. As such, the co-polymer materials disclosed herein have wide applicability within electronic systems, including those with water-based environments, such as car batteries. This is in contrast to existing electronic materials such as PEDOT:PSS, which is conventionally used only in dry environments, owing to its poor water properties.

Further, the specific order of mixing used to obtain the co-monomer mixture allows a bulk three-dimensional co-polymer structure to be achieved (rather than a largely two-dimensional polymer film). The resulting co-polymer is self-supporting, and as such does not need to be polymerized onto a substrate.

In a first aspect the present invention provides a process of forming a cross-linked electronically active hydrophilic co-polymer comprising the steps of:
 a. mixing an intrinsically electronically active material with water to form an intermediate mixture;
 b. adding at least one hydrophilic monomer, at least one hydrophobic monomer, and at least one cross-linker to the intermediate mixture to form a co-monomer mixture;
 C. polymerising the co-monomer mixture.

In a second aspect, the present invention provides a homogenous, isotropic electronically active hydrophilic co-polymer obtainable by the process according to the first aspect of the invention.

In a third aspect, the present invention provides a co-monomer mixture comprising at least one hydrophobic monomer, at least one hydrophilic monomer, water, at least one cross-linker, and an intrinsically electronically active material.

Further aspects are defined in the independent claims and include a variety of industrial products that make use of electronic systems. One such industrial product is a supercapacitor. As a result of their improved electronic properties, the co-polymers described herein may be used as the electrolyte component within a supercapacitor system. When the co-polymers described herein are used in this context, the resulting supercapacitor achieves particularly high capacitance values. Furthermore, as a result of the improved mechanical properties and self-supporting nature of the co-polymers described herein, the resulting supercapacitor does not require an additional separator.

DESCRIPTION OF THE PREFERRED EMBODIMENTS

As used herein, the term "monomer" takes its usual definition in the art, and so refers to a molecular compound that may chemically bind to another monomer to form a polymer.

As used herein, the term "co-monomer mixture", takes its usual definition in the art, and so refers to a solution or dispersion of miscible monomers that, when polymerised, forms a co-polymer.

As used herein, the term "cross-linker" refers to molecular compound capable of forming chemical bonds between polymer chains, and includes compounds such as methylenebisacrylamide, N-(1-Hydroxy-2,2-dimethoxyethyl)acrylamide, allyl methacrylate and ethylene glycol dimethacrylate. Allyl methacrylate and ethylene glycol dimethacrylate are preferred. The cross-linker may be hydrophobic or hydrophilic.

As used herein, the term "polymerisation initiator" takes its usual definition in the art, and so refers to an agent capable of initiating the process of chemical polymerisation, for example free-radical polymerisation. Azobisisobutyronitrile (AIBN) and-hydroxy-2-methylpriophenone are examples of such initiators. Azobisisobutyronitrile (AIBN) has utility when polymerisation is by thermal means, and 2-hydroxy-2-methylpriophenone is suitable for use with UV polymerisation.

As used herein, the term "intermediate mixture" refers to a solution or dispersion to which further components are added. For instance, in the context of forming the co-monomer mixture, the term "intermediate mixture" refers to a mixture including some, but not all the components of the complete co-monomer mixture.

As used herein, the term "co-polymer" takes its usual definition in the art, and so refers to a polymer whose polymer chains comprise two or more different types of monomers.

As used herein, the term "water properties" when used in relation to a polymer material, refers the properties and behaviour of that polymer material in relation to water and other aqueous environments, such as saline solution i.e. its hydrophilicity and stability in an aqueous environment.

As used herein, the term "homogenous", when used in relation to a polymer material, refers to a polymer material whose physical properties (e.g. conductive properties and water properties) are substantially uniform throughout its entire structure.

As used herein, the term "isotropic", when used in relation to a polymer material, refers to a polymer material whose properties are the same in all orientations.

As used herein, the term "homogenous" when used in relation to a co-monomer mixture, refers to a co-monomer solution or dispersion comprising miscible monomers that are uniformly dissolved or mixed.

As used herein, the term "hydrophilic polymer" refers to a polymer that dissolves in water when it is not cross-linked and absorbs water and swells to form a stable elastic solid when cross-linked.

As used herein, the term "hydrophilic monomer" takes its usual definition in the art, and so refers to a monomer with an affinity for water molecules. The term "hydrophobic monomer" also takes its usual definition in the art, and so refers to a monomer that repels water molecules.

As used herein, the term "electrically active" takes its usual definition in the art, and so can encompass both electronically active and ionically active materials.

As used herein, the term "electronically active material" takes its usual definition in the art, and refers to a material in which the conduction process is principally dependent upon electron transfer, or in which an electron is yielded as an output at an interface.

As used herein, the term "intrinsically electronically active material" refers to a material that is electronically active without requiring further modification to be rendered electronically active.

As used herein, the term "ionically active material" takes its usual definition in the art, and refers to a material in which the conduction process is principally dependent on ion transfer.

As used herein, the term "water" as a component in the intermediate or co-monomer mixture refers to added water, i.e. water added to the remaining components not including any water already associated with the raw materials of the remaining components, e.g. when such raw materials are supplied as an aqueous solution or dispersion.

As used herein, the term "liquid electrolyte" takes its usual definition in the art, and so refers to a solution of cations (such as potassium, sodium, calcium and magnesium) and anions (such as chloride, carbonate and phosphate) dissolved in a solvent, such as water, acetonitrile, propylene carbonate or tetrahydrofuran. As used herein, the term "aqueous electrolyte" takes its usual definition in the art, and so refers to an aqueous solution containing cations (such as potassium, sodium, calcium and magnesium) and anions (such as chloride, carbonate and phosphate).

As used herein, the term "optoelectronic display device" takes its usual definition in the art, and so refers to a device capable of sourcing, detecting and controlling electromagnetic energy, such as infra-red ultraviolet, or visible light.

In a first aspect the present invention provides a process of forming a cross-linked electronically active hydrophilic co-polymer comprising the steps of:
  a. mixing an intrinsically electronically active material with water to form an intermediate mixture;
  b. adding at least one hydrophilic monomer, at least one hydrophobic monomer, and at least one cross-linker to the intermediate mixture to form a co-monomer mixture;
  C. polymerising the co-monomer mixture.

Preferably, the electronically active material is a polymer

It has been found that when the components are mixed in the specific order according to the first aspect of the present invention, a homogenous co-monomer mixture is obtained. This is in contrast to the other possible orders of mixing, where the components are prone to separate out into distinct layers during the polymerisation process, thereby preventing the formation of a continuous material. As these problems are avoided with the process disclosed herein, a continuous bulk three-dimensional co-polymer structure is achieved, that is of a self-supporting nature.

Preferably, the intrinsically electronically active material is PEDOT:PSS. The problems associated with other orders of mixing aside from that of the process disclosed herein are particularly pronounced for PEDOT:PSS. Yet, when PEDOT:PSS is used as the intrinsically electronically active material in the context of the present invention, good results are achieved, as shown in the examples.

Preferably, in step b, the at least one hydrophilic monomer and the at least one hydrophobic monomer are added to the intermediate mixture prior to the addition of the cross-linker.

Preferably, in step b, the at least one hydrophilic monomer is added to the intermediate mixture prior to the addition of the at least one hydrophobic monomer.

Preferably, the at least one hydrophilic monomer is selected from methacrylic acid, hydroxyethyl methacrylate (e.g. 2-hydroxyethyl methacrylate), ethyl acrylate, vinyl pyrrolidone (e.g. n-vinyl-2-pyrrolidone), propenoic acid methyl ester (e.g. propenoic acid 2-methyl ester), monomethacryloyloxyethyl phthalate, poly-vinyl alcohol, ammonium sulphatoethyl methacrylate, or a combination thereof. Preferably, the co-monomer mixture comprises one hydrophilic monomer.

More preferably, the at least one hydrophilic monomer is selected from vinyl-2-pyrrolidone (VP) and 2-hydroxyethyl methacrylate, or a combination thereof. More preferably, the at least one hydrophilic monomer is selected from 1-vinyl-2-pyrrolidone (VP) and 2-hydroxyethyl methacrylate, or a combination thereof.

Preferably, the at least one hydrophobic monomer is selected from methyl methacrylate, acrylonitrile (AN), methacryloxypropyltris(trimethylsiloxy)silane, 2,2,2-trifluoroethyl methacrylate, allyl methacrylate, or a combination thereof. Preferably, the co-monomer mixture comprises one hydrophobic monomer.

More preferably, the at least one hydrophobic monomer is selected from acrylonitrile and methyl methacrylate, or a combination thereof.

Preferably, the at least one cross-linker is selected from allyl methacrylate or ethylene glycol dimethacrylate.

It will be appreciated from the definitions above, that the terms used above are not necessarily mutually exclusive. For example, the terms "hydrophobic monomer" and "cross-linker" are not necessarily mutually exclusive. In the present invention, the hydrophobic monomer and the cross-linker may be the same or different.

The hydrophobic monomer may, in certain embodiments, be the same as the cross-linker. For example, in certain embodiments, both the cross-linker and the hydrophobic monomer are allyl methacrylate.

In some embodiments, the hydrophilic monomer and/or the hydrophobic monomer are non-cross-linking. There is no overlap between the terms "non-cross-linking hydrophobic monomer", "non-cross-linking hydrophilic monomer" and "cross-linker". In these embodiments, the cross-linker, the hydrophobic monomer and the hydrophilic monomers are different chemical species.

Preferably, the hydrophobic monomer is a different chemical species to the cross-linker. In these embodiments, the use of a hydrophobic monomer that is different to the cross-linker allows the formation of a co-polymer with particularly good mechanical stability, as stated in the Examples.

Preferably, the polymerisation step is carried out by thermal, UV or gamma radiation.

More preferably, the polymerisation step is carried out by UV or gamma radiation.

In a preferred embodiment, the co-monomer mixture further comprises a polymerisation initiator. The polymerisation initiator may be azobisisobutyronitrile (AIBN) or 2-hydroxy-2-methylpriophenone.

The presence of a polymerisation initiator is particularly preferred when the polymerisation is by thermal or UV radiation. In one embodiment, the polymerisation is by thermal means and the initiator is azobisisobutyronitrile (AIBN). In another embodiment, the polymerisation is by UV radiation and the initiator is 2-hydroxy-2-methylpriophenone.

The individual components of the co-monomer mixture should be included in sufficient quantities such that they mix uniformly thereby forming a homogenous solution or dispersion.

The hydrophobic monomer may be present in an amount of 5% to 80% by weight, preferably, 5% to 60% by weight, most preferably 5% to 20% by weight based on the total weight of the co-monomer mixture. The hydrophilic monomer may be present in an amount of 5% to 90% by weight, preferably 5% to 80% by weight, most preferably 50% to 70% by weight based on the total weight of the co-monomer mixture. The cross-linker agent may be present in the co-monomer mixture in an amount of 1% to 25% by weight, preferably 2% to 15% by weight, most preferably 2% to 10% by weight based on the total weight of the co-monomer mixture. The intrinsically electronically active material may be present in an amount of 1% to 20% by weight and most preferably 2% to 10% by weight.

The amount of water in the co-monomer mixture must be sufficient to provide a uniformly mixed homogenous solution or dispersion, and must be sufficient to uniformly disperse the intrinsically electronically active material, which is insoluble in water. The amount of water in the co-monomer mixture may be 1% to 50% by weight, preferably 5% to 50% by weight, most preferably 5% to 20% by weight based on the total weight of the co-monomer mixture.

Preferably, the ratio of the at least one hydrophilic monomer to the at least one hydrophobic monomer is from 20:1 to 1:1, more preferably, 20:1 to 5:1, in particular 10:1, in the co-monomer mixture.

Preferably, the ratio of the at least one hydrophilic monomer and the at least one hydrophobic monomer: the intrinsically electronically active material is from 30:1 to 2:1, more preferably 6:1 to 3:1, in the co-monomer mixture.

Preferably, the ratio of the water to the intrinsically electronically active material is from 1:1 to 10:1, preferably 1:1 to 3:1, in particular 2:1, in the co-monomer mixture.

It has been found that particularly good results are achieved when using the components in the preferable ratios set out above. When used in these ratios, the components are particularly miscible with each other, and this assists the polymerisation process and the formation of a continuous bulk co-polymer material. The ratios referred to are the volume ratios of the various components.

In a preferred embodiment, the co-polymer is hydrated following polymerisation. This hydration step may be carried out using distilled deionized (DD) water, or with an aqueous solution, such as saline, brine, acid, or alkali solution. When saline solution is used for the hydration step, the saline solution preferably has 0.002 g/cc to 0.1 g/cc of NaCl in water, more preferably 0.009 g/cc of NaCl in water. When brine solution is used for the hydration step, the brine solution preferably has 0.3 g/cc of NaCl in water. When acid solution is used for the hydration step, the acid is preferably 5 mol/dm$^3$ $H_2SO_4$. When alkali solution is used for the hydration step, the alkali solution is preferably an aqueous solution of KOH with the KOH is present at 10 wt % to 30 wt %. It is preferred that this hydration step results in the amount of water in the co-polymer being at least 10% by weight, preferably at least 20% by weight, based on the total weight of the hydrated co-polymer. Without wishing to be bound by theory, when water is present in this quantity, then it can act as a "plasticizer" and enable the other components of the co-polymer to have sufficient intermolecular mobility such that the conformation of the co-monomer self-organises over time. For example, this self-organisation can occur within a period of about 7-14 days. It has been observed that, following manufacture and/or further hydration, the electrical properties of the co-polymer improve over time. As such, in a preferred embodiment, the co-polymer is stored for at least 7 days, preferably for at least 14 days, following hydration. Not only are the co-polymers stable following hydration, but they also display improved electrical conductivity, as will be shown in the examples, where the properties are demonstrated to improve over a period of 54 days after hydration.

The co-monomer mixture may be provided and polymerised using UV, gamma or thermal radiation. The UV or gamma radiation may be carried out under ambient temperature and pressure, whilst thermal polymerisation may be carried out at temperatures up to 70° C.

In a second aspect the present invention provides a homogenous and isotropic electronically active hydrophilic co-polymer obtainable by the process according to any of the embodiments set out with respect to the first aspect of the invention. It is believed that such a homogeneous co-polymer is novel.

In a third aspect, the present invention provides a co-monomer mixture comprising at least one hydrophobic monomer, at least one hydrophilic monomer, water, at least one cross-linker, and an intrinsically electronically active material.

Preferred hydrophobic monomers, hydrophilic monomers, intrinsically electronically active materials and cross-linkers are defined above.

The polymerisation of the above-mentioned co-monomer mixtures result in the homogenous, isotropic electronically active hydrophilic co-polymers disclosed herein.

Co-polymers and co-monomer mixtures disclosed herein can be used in a variety of applications, and are particularly useful in electronic systems with a water-based environment. However, the co-polymers disclosed herein also provide benefits when used in other electronic systems i.e. those with non-water-based environments, owing to their excellent mechanical properties and electrical conductivity.

Preferably, the co-monomer mixture disclosed herein is used in 3D printing, wherein the co-monomer mixture is polymerised to form a 3D image. It is thought that the hydrophilicity of the co-polymers formed from the co-monomer mixture is advantageous when forming a 3D printed image.

Preferably, the co-polymers disclosed herein are used in a battery together with an aqueous electrolyte. Preferably, the battery is a lead acid battery. Alternatively, the co-polymers disclosed herein are used in an electrochemical cell together with water or an aqueous electrolyte. In this embodiment, the battery or electrochemical cell may be flexible, which is possible due to the advantageous properties of the co-polymers of the present invention. In certain embodiments, the co-polymers disclosed herein are used in a photovoltaic cell.

Preferably, the co-polymers disclosed herein are used as the electrolyte component within a supercapacitor system. As will be appreciated by the skilled person, supercapacitors generally comprise two electrodes and an electrolyte component located therebetween. The maximum capacitance value achieved by a supercapacitor may depend on the nature of the electrolyte as well as the nature of the electrodes. As will also be appreciated by the skilled person, there are multiple different kinds of supercapacitor systems. These include double-layer supercapacitors, pseudo-capacitive supercapacitors, and hybrid supercapacitors. Double-layer supercapacitors typically comprise carbon electrodes that are of comparatively low cost. The capacitance of double-layer supercapacitors is largely electrostatic capacitance. Meanwhile, pseudo-capacitive supercapacitors comprise comparatively higher cost electrodes that are capable of undergoing an oxidation-reduction (redox) reaction together with the electrolyte. Such redox active electrodes can comprise, for example, lanthanum ruthenium or vanadium. The capacitance of pseudo-capacitive supercapacitors is therefore significantly increased (or augmented) by electrochemical capacitance. Hybrid supercapacitors comprise a combination of electrodes with differing characteristics, and can for example comprise one carbon electrode and one electrode capable of undergoing a redox reaction with the electrolyte. The capacitance of hybrid supercapacitors is therefore a combination of electrostatic capacitance and electrochemical capacitance. Conventionally, the electrolyte component within the above supercapacitor systems is a liquid electrolyte.

When the co-polymers disclosed herein are used in place of the conventional liquid electrolyte of a supercapacitor, the resulting supercapacitor achieves particularly high capacitance values. Without wishing to be bound by theory, it is thought that pseudo-capacitive supercapacitors achieve higher capacitance values due to the ability of the electrolyte and the electrodes to under a redox reaction with each other. Without wishing to be bound by theory, it is thought that the electronic properties of the co-polymers disclosed herein are such that an effective redox reaction is achieved, thereby providing particularly increased capacitance values. Good capacitance values are also achieved in the context of hybrid supercapacitors. In summary, for a given supercapacitor system and with a given electrode, the maximum capacitance is increased when using the co-polymers disclosed herein as the electrolyte component within a supercapacitor. Further, the co-polymers remain stable across a commercially acceptable voltage range.

Furthermore, as a result of the improved mechanical properties and self-supporting nature of the co-polymers described herein, a supercapacitor including the co-polymers disclosed herein as the electrolyte component does not require an additional separator. Conventionally, when a liquid electrolyte is used within a supercapacitor system, it is necessary for the supercapacitor to further comprise an additional separator in order to maintain separation between the two electrodes. When the co-polymers described herein are used in place of the conventional liquid electrolyte, their mechanical properties and self-supporting nature is such that separation between the electrodes is maintained even in absence of an additional separator.

In another embodiment, the co-polymers disclosed herein are used in a sensing system. Sensing systems may include one or more chemical components, where these chemical components are capable of detecting a particular compound. Advantageously, these one or more chemical components may be dispersed throughout the structure of the co-polymers disclosed herein, and the resulting co-polymer included in the sensing system. The co-polymers disclosed herein act as a support matrix for the chemical components, wherein the chemical components are stably retained within the co-polymer structure, and their sensing ability preserved. The particular compounds detected by such sensing systems can include glucose. The skilled person will be familiar with the chemical components capable of detecting glucose, and such chemical components can include Benedict's reagent (which comprises anhydrous sodium carbonate, sodium citrate and copper(II) sulfate pentahydrate).

In another embodiment, the co-polymers disclosed herein are used in an optoelectronic display device. In this embodiment, the optoelectronic display device is preferably flexible, which is possible due to the advantageous properties of the co-polymers of the present invention.

In another embodiment, the co-polymers disclosed herein may be used to form an electrically conducting adhesive junction, wherein the adhesive junction is positioned between adjacent electrically conducting components. Preferably, the adjacent electrically conducting components together with the adhesive junction form a stack of integrated circuits, such as a stack of 2D electrical chips.

The present invention will now be demonstrated according to the following examples.

Example 1: 4:1 VP to PEDOT-PSS

A first hydrophilic co-polymer was prepared using vinyl pyrollidone and PEDOT-PSS in a 4:1 ratio, together with allyl-methacrylate (as crosslinking agent and hydrophobic co-monomer). In addition, a second hydrophilic co-polymer was prepared using vinyl pyrollidone and PEDOT-PSS in a 4:1 ratio, together with allyl methacrylate (as crosslinking agent) and acrylonitrile (AN) (as hydrophobic co-monomer).

To obtain a 4:1 ratio of VP to PEDOT-PSS, 1.5 ml of water was added to 1 ml of PEDOT-PSS whilst stirring using a magnetic stirrer bar. 4 ml of 1-vinyl-2-pyrrolidone was then added dropwise to the PEDOT-PSS/water mixture. After a homogenous mixture was obtained, 0.195 ml of allyl methacrylate was added, as was 0.13 ml of 2-hydroxy-2-methylpriophenone (as the initiator). The co-monomer mixture was then cured under UV to produce the first crosslinked co-polymer.

The above process was repeated with the additional step that 6 weight % of acrylonitrile was added to the co-monomer mixture following the addition of crosslinking agent (allyl methacrylate) and prior to the curing step, to obtain the second crosslinked co-polymer.

Each co-polymer was hydrated in DD water, and the conductivity tested immediately after a maximum level of hydration was achieved; for the first co-polymer (i.e. no acrylonitrile present) this was when a water content of approximately 69% was reached, and for the second co-polymer (i.e. with acrylonitrile present) this was when a water content of approximately 63% was reached. The electrical properties were then measured following a period of 54 days after hydration. The results are shown in Table 1 (below) and in FIG. 1.

In Table 1, the term "expansion ratio" refers to the thickness of the co-polymer (i.e. the shortest linear dimension of the co-polymer) after a maximum level of hydration has been reached divided by the thickness of the co-polymer before hydration. The thickness was measured by any suitable means such as a micrometer, vernier calipers or a travelling microscope.

TABLE 1

| VP:PEDOTPSS + water hydrated | No. of days after initial hydration | Mass (g) | Expansion ratio | Minimum current (mA) | Maximum current (mA) |
|---|---|---|---|---|---|
| 4:1 | 0 | 0.814 | 1.53 | 0.05 | 0.24 |
|  | 54 | 0.810 |  | 0.20 | 3.90 |

TABLE 1-continued

| VP:PEDOTPSS + water hydrated | No. of days after initial hydration | Mass (g) | Expansion ratio | Minimum current (mA) | Maximum current (mA) |
|---|---|---|---|---|---|
| 4:1 with AN | 0 | 0.912 | 1.44 | 0.05 | 0.25 |
|  | 54 | 0.899 |  | 0.08 | 1.68 |

As can be seen, both co-polymers display good electrical conductivity immediately after hydration. Both co-polymers displayed improved electrical properties after 54 days following hydration. The addition of acrylonitrile (AN) provides co-polymers that maintain a good level of electrical conductivity, whilst improving the mechanical properties of the polymer before and after hydration.

Example 2: 3:1 VP to PEDOT-PSS

A first hydrophilic co-polymer was prepared using vinyl pyrollidone and PEDOT-PSS in a 3:1 ratio, together with allyl-methacrylate (as crosslinking agent and hydrophobic co-monomer). In addition, a second hydrophilic co-polymer was prepared using vinyl pyrollidone and PEDOT-PSS in a 3:1 ratio, together with allyl methacrylate (as crosslinking agent) and acrylonitrile (as hydrophobic co-monomer).

Each of these co-polymers was prepared using the same method as that of Example 1, except that 3 ml (rather than 4 ml) of 1-vinyl-2-pyrollidone was used.

Figure 2:
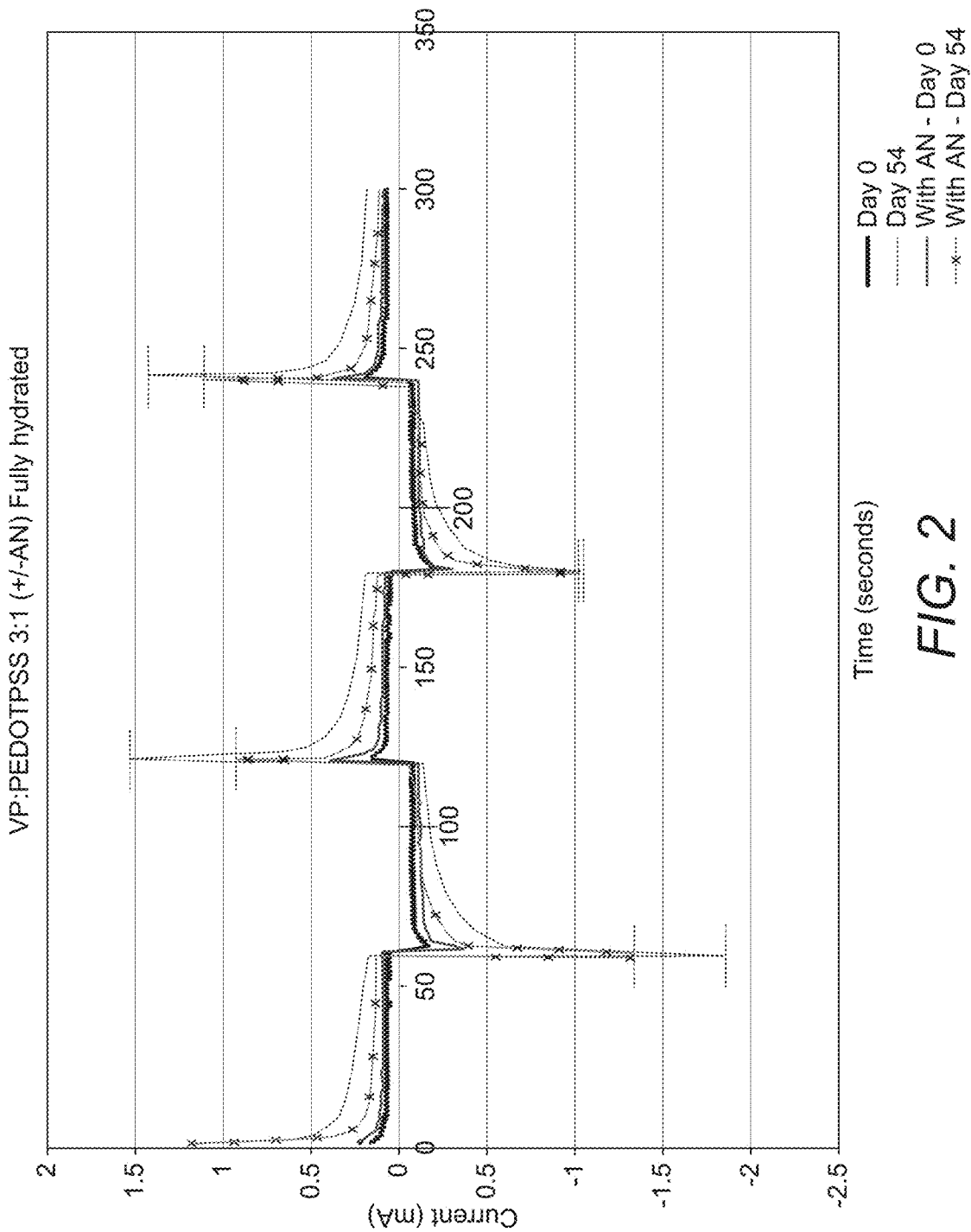
FIG. 2 is a plot of current versus time for VP-PEDOTPSS in a 3:1 ratio (with and without AN) after a maximum level of hydration was achieved.

Each co-polymer was hydrated in DD water, and the conductivity tested immediately after maximum level of hydration was achieved; for the first co-polymer (i.e. no acrylonitrile present) this was when a water content of approximately 61% was reached, and for the second co-polymer (i.e. with acrylonitrile present) this was when a water content of approximately 57% was reached. The electrical properties were then measured following a period of 54 days after hydration. The results are shown in Table 2 (below) and in FIG. 2. The expansion ratio in Table 2 was calculated in the same manner as for Table 1.

TABLE 2

| VP:PEDOTPSS + water hydrated | No. of days after initial hydration | Mass (g) | Expansion ratio | Minimum current (mA) | Maximum current (mA) |
|---|---|---|---|---|---|
| 3:1 | 0 | 0.893 | 1.42 | 0.08 | 0.39 |
|  | 54 | 0.890 |  | 0.12 | 1.85 |
| 3:1 with AN | 0 | 0.864 | 1.38 | 0.06 | 0.34 |
|  | 54 | 0.866 |  | 0.08 | 1.32 |

As with Example 1, both co-polymers display good electrical conductivity immediately after hydration. Both co-polymers displayed improved electrical properties after 54 days following hydration. The addition of acrylonitrile (AN) provides co-polymers that maintain a good level of electrical conductivity, whilst improving the mechanical properties of the polymer before and after hydration.

For both examples 1 and 2, hydration was required to achieve optimal electrical conductivity.

What is claimed is:

1. An electrochemical cell, comprising:
a homogenous, isotropic, cross-linked electronically active hydrophilic co-polymer; and
two electrodes with the co-polymer located therebetween,
wherein the co-polymer is formed by a process comprising the steps of:
   a. mixing an intrinsically electronically active material with water to form an intermediate mixture;
   b. adding at least one hydrophilic monomer, at least one hydrophobic monomer, and at least one cross-linker to the intermediate mixture to form a co-monomer mixture; and
   c. polymerising the co-monomer mixture to form the co-polymer,
wherein the co-monomer mixture comprises water in an amount of 5%-50% by weight based on a total weight of the co-monomer mixture,
wherein the co-polymer is self-supporting, and
wherein the electrochemical cell is a supercapacitor.

2. The electrochemical cell according to claim 1, wherein, in step b, the at least one hydrophilic monomer and the at least one hydrophobic monomer are added to the intermediate mixture prior to the addition of the cross-linker.

3. The electrochemical cell according to claim 1, wherein, in step b, the at least one hydrophilic monomer is added to the intermediate mixture prior to the addition of the at least one hydrophobic monomer.

4. The electrochemical cell according to claim 1, wherein the intrinsically electronically active material is selected from polyethylenedioxythiophene: polystyrene sulphonate, polypyrrole, polyaniline, polyacetylene, and a combination thereof.

5. The electrochemical cell according to claim 1, wherein the at least one hydrophilic monomer is selected from methacrylic acid, 2-hydroxyethyl methacrylate, ethyl acrylate, vinyl pyrrolidone, propenoic acid methyl ester, monomethacryloyloxyethyl phthalate, ammonium sulphatoethyl methacrylate, poly vinyl alcohol, and a combination thereof.

6. The electrochemical cell according to claim 1, wherein the at least one hydrophilic monomer is selected from vinyl pyrrolidone, hydroxyethyl methacrylate, and a combination thereof.

7. The electrochemical cell according to claim 1, wherein the at least one hydrophobic monomer is selected from methyl methacrylate, allyl methacrylate, acrylonitrile, methacryloxypropyltris(trimethylsiloxy)silane, 2,2,2-trifluoroethyl methacrylate, and a combination thereof.

8. The electrochemical cell according to claim 1, wherein the crosslinking agent is allyl methacrylate or ethylene glycol dimethacrylate.

9. The electrochemical cell according to claim 1, wherein both the cross-linker and the hydrophobic monomer is allyl methacrylate.

10. The electrochemical cell according to claim 1, wherein the polymerisation step is carried out by thermal, UV, or gamma radiation.

11. The electrochemical cell according to claim 1, wherein the co-monomer mixture further comprises a polymerisation initiator.

12. The electrochemical cell according to claim 11, wherein the polymerisation initiator is azobisisobutyronitrile or 2-hydroxy-2-methylpriophenone.

13. The electrochemical cell according to claim 1, wherein the ratio of the at least one hydrophilic monomer to the at least one hydrophobic monomer is from 20:1 to 1:1 in the co-monomer mixture.

14. The electrochemical cell according to claim 1, wherein the ratio of the at least one hydrophilic monomer and the at least one hydrophobic monomer: the intrinsically electronically active material is from 30:1 to 2:1 in the co-monomer mixture.

15. The electrochemical cell according to claim 1, wherein the ratio of the water to the intrinsically electronically active material is from 1:1 to 10:1 in the co-monomer mixture.

16. The electrochemical cell according to claim 1, wherein the ratio of the water to the intrinsically electronically active material is from 1:1 to 3:1 in the co-monomer mixture.

17. The electrochemical cell according to claim 1, wherein the process by which the co-polymer is formed further comprises the step of hydrating the co-polymer after the co-monomer mixture is polymerised.

18. The electrochemical cell according to claim 17, wherein the co-polymer is hydrated such that the hydrated co-polymer comprises at least 10 wt % water, based on a total weight of the hydrated co-polymer.

* * * * *